United States Patent
Stöppelmann et al.

(10) Patent No.: US 6,469,092 B1
(45) Date of Patent: Oct. 22, 2002

(54) ANTI-STATIC AND PEROXIDE-STABLE MOLDING COMPOUNDS

(75) Inventors: Georg Stöppelmann, Bonaduz; Manfred Hewel, Rodels, both of (CH)

(73) Assignee: ENS-Inventa AG (CH)

( * ) Notice: Subject to any disclaimer, the term of this patent is extended or adjusted under 35 U.S.C. 154(b) by 0 days.

(21) Appl. No.: 09/302,110

(22) Filed: Apr. 29, 1999

(51) Int. Cl.⁷ ............... C08J 3/00; C08K 3/04; C08L 67/00; C08L 77/00; C08L 79/00
(52) U.S. Cl. .......... 524/495; 138/137; 524/496; 524/601; 524/606
(58) Field of Search ............... 524/495, 496, 524/601, 606; 138/137

(56) References Cited

U.S. PATENT DOCUMENTS

| | | |
|---|---|---|
| 2,071,050 A | 2/1937 | Carothers |
| 2,071,251 A | 2/1937 | Carothers |
| 5,171,560 A | 12/1992 | Tennent |
| 5,313,987 A * | 5/1994 | Rober et al. ............ 138/137 |
| 5,469,892 A | 11/1995 | Noone et al. ............ 138/21 |
| 6,090,459 A | 7/2000 | Jadamus et al. ........ 428/36.4 |

FOREIGN PATENT DOCUMENTS

| | | |
|---|---|---|
| DE | 19 64 313 | 9/1970 |
| DE | 24 07 155 | 8/1974 |
| DE | 21 52 194 | 8/1978 |
| DE | 21 52 194 B 2 | 8/1978 |
| DE | 27 12 987 | 10/1978 |
| DE | 27 12 987 A 1 | 10/1978 |
| DE | 4025301 C1 | 4/1992 |
| DE | 40 25 301 | 4/1992 |
| DE | 111529 A1 | 9/1992 |
| EP | 0 470 606 A1 | 2/1992 |
| EP | 0 781 799 A1 | 7/1997 |
| WO | WO 94/14900 | 7/1994 |
| WO | WO 94/23433 | 10/1994 |

OTHER PUBLICATIONS

Bartholome et al., Ullmanns Encyklopadie der technischen Chemie, 1980, 19:61–88.
Gachter and Muller "Taschenbuch der Kunststoff–Additive," Carl Hanser Verlag Munchen Wein, pp. 590, 598 (1983).
Toray Ind. Inc. Abstract XP–002110428, Database WPI, Derwent Publications Ltd., Week 9820 (Mar. 20, 1998).
Ullmanns Enzyklopadie der technishen Chemie, vol. 19, pp. 61 et seq.
Ullmann's Encyclopedia of Industrial Chemistry, vol. A5, pp. 152–154.
Probst et al., New Opportunities with a New Carbon Black Process, KGK Kautschuk Gummi Kunststoffe 46, Jahrgang, Nr. 9/93, pp. 707–709.
Probst et al., Low Surface Aarea Conductive Carbon Blacks, KGK Kautschuk Gummi Kunststoffe 48, Jahrgang, Nr. 7–8/95, pp. 509–511.
Probst et al., "Eine Neue Familie von LeitruBen", MMM Carbon Brussel, pp. 900–905.
Stabilisatoren, et al., Taschenbuch der Kunststoff–Additive, Eigentum der EMS–Chemie Ag. Domat/EMS, pp. 590, 598.

* cited by examiner

*Primary Examiner*—Patrick D. Niland
(74) *Attorney, Agent, or Firm*—Standley & Gilcrest LLP

(57) ABSTRACT

The invention concerns anti-static, peroxide-stable molding compounds on the basis of polyamides and/or polyesters, whereby the molding compounds are modified with very pure conductive carbon black with a low specific surface area. These anti-static molding compounds can be used for the production of injection-molded or extruded parts and the production of sheets or multi-layer hoses and tubes.

39 Claims, No Drawings

ANTI-STATIC AND PEROXIDE-STABLE MOLDING COMPOUNDS

DESCRIPTION

The invention concerns molding compounds based on polyamides and/or polyesters that are simultaneously anti-static and stabilized against peroxides. These anti-static molding compounds can be used for the production of injection-molded or extruded parts, for the production of sheets or multi-layer hoses or tubes.

Making polymers anti-static with conductive additives such as carbon black, carbon fibers and metal powder has been known in the art for a long time (see Gaechter, Muller in "Plastics Additives" p. 762, 1993). With metal powder, large quantities of fill material are necessary, whereby the mechanical properties are strongly influenced. Moreover, these metal powders are, for the most part, very expensive. The addition of carbon fibers leads to stiffening and to a reduction of impact strength and elongation at break, which is particularly disadvantageous if tubes are to be made anti-static.

Fuel lines made of plastics such as polyamides have been installed in vehicles for a long time. Through high fuel circulation, such as is typical with fuel-injected motors, these tubes can become highly charged. In the extreme case, this static charging can lead to an explosion-like destruction of the lines and to leaking of fuel from the lines. There is an increased safety risk because of the acute danger of fire. Therefore, developments were implemented for producing polymers with low conductivity and, especially in polyamide 11 or polyamide 12, to blend in electrically conductive additives such as the above-mentioned carbon black, carbon fibers and metal powder.

In DE-A-40 25 301, anti-static and peroxide-stable fuel lines are described in which carbon black-filled polyamides and polyethylenes are used in multi-layer tubes. However, it cannot be determined from this document how the problem of peroxide resistance is effectively to be resolved.

If polyamide or polyester molding compounds are filled with conductive carbon black, even though they show an anti-static effect, the thermal and chemical resistance is reduced. In particular, the resistance against peroxides is of foremost significance for applications in automobile construction, in which polyamides and polyesters are in constant contact with fuel. An additional possibility for making polyamides and polyesters anti-static is the incorporation of graphite fibers, which were described in applications U.S. Pat. No. 5171560 and WO 94/23433 and in Plastics World (September 1996). With these graphite fibers, making polyamides and polyesters anti-static is accomplished without losing the peroxide stability. However, these graphite fibers are very expensive and their incorporation into polyamides and polyesters is difficult because of the high viscosities of the resulting compounds.

It is therefore the objective of the invention to make molding compounds based on polyamides and/or polyesters anti-static without losing their resistance to peroxides.

This objective is fulfilled via the anti-static, peroxide-stable molding compounds according to claim 1, whereby the molding compounds are modified with very pure conductive carbon black with low specific surface area.

These molding compounds can be used for the production of injection molded or extruded parts, for the production of sheets or multi-layer hoses or tubes (claim 7).

The above-mentioned objective is also accomplished by means of thermoplastic multi-layer composites according to claim 8, whereby at least one layer consists of a molding compound based on a polyester or polyamide that is specified with very pure conductive carbon black with a low specific surface area. The multi-layer composite contains at least one second layer at least partially adjacent to the previously mentioned layer on the basis of a polyamide molding compound and, in some cases, a coupling layer lying between them which binds the polyester or polyamide layer to the previously mentioned polyamide or polyester layer by adhesion.

Beneficial embodiments of the invention are included in the remaining subclaims.

Surprisingly, it was determined that if these very pure conductive carbon blacks are incorporated into polyamide and/or polyester molding compounds, the molding compounds are peroxide-resistant. In this case, "pure" means that the carbon black has only very small quantities of metallic impurities, such as copper or iron. Furthermore, it is important that the oxygen and sulfur content of these carbon blacks is as small as possible.

In a preferred embodiment of the invention, the molding compound with the polyamide basis possesses a continuous polyamide phase and the molding compound with the polyester basis possesses a continuous polyester phase.

The possible polyamides according to the invention are:

Homo- and copolymers derived from dicarboxylic acids, diamines, aminocarboxylic acids and/or lactams. Lactams with 6 to 12 C atoms, $\alpha,\omega$-aminocarboxylic acids with 6 to 12 C atoms, dicarboxylic acids with 2 to 44 C atoms and aliphatic and/or cycloaliphatic diamines with 2 to 12 C atoms are preferred. According to the invention, the polyamides selected from homo- and/or copolyamides based on PA 6, PA 46, PA 66, PA 612, PA 1010, PA 1012, PA 69, PA 11, PA 12, PA 1212, PA 6T, PA 61, PA 12T, PA121, PA 12/6T, PA 12/61 and/or mixtures of them are preferred, whereby PA 12 in particular is preferred.

The nomenclature of the polyamides corresponds to international standards, whereby the first number(s) specify the number of C atoms in the starting amine and the last number(s) specify the number of C atoms in the dicarboxylic acid. If only one number is specified, then this means that one is starting with an aminocarboxylic acid or its lactam. The number average of the molecular weight of the polyamides should be above 5,000, preferably above 10,000.

Insofar as copolymers are used, they can contain, for example, adipic acid, sebacic acid, suberic acid, isophthalic acid, terephthalic acid, di-lauric acid as a co-acid, or 4,4'-diaminodicyclohexylmethane, 3,3'-dimethyl-4,4'-diaminodicyclohexylmethane trimethyl hexamethylene diamine, hexamethylene diamine or similar compounds as co-diamines.

The production of these copolyamides is known, for example, from DE-AS 21 52 194.

Mixed aliphatic/aromatic polycondensates, as described for example in U.S. Pat. No. 2,071,250, 2,071,251 et al. are also suitable as polyamides. Polyether ester amides or polyether amides are likewise appropriate as polyamide-suitable polycondensates. Products of this type are described, for example, in DE OS 27 12 987. Furthermore, polyesteramides, which are known from DE-A 19 64 313, are a possibility within the context of the invention.

To the extent that it is required, the polyamides can be impact modified. Suitable impact resistance modifiers are, for example, ethylene/propylene copolymers or ethylenelpropylene/diene copolymers or even other impact resistance-enhancing rubbers.

In addition, a flame retardant as well as other additive materials such as pigments, oligomers and polymers, stabilizers and processing aids, as well as reinforcing agents can be included. The portion of reinforcing agents can amount to up to 50% of the entire molding compound, that of the flame retardant up to 15%, and that of all remaining additive materials together can be up to 5%, relative to the total molding mass in each case.

Especially preferred for the applications in the fuel line area, or in the automotive area, are polyamide 12 and semi-aromatic polyamides.

Those polymers in which the monomer units are predominately (i.e., through ester linkages) linked with one another are understood to be polyesters. Possibilities here are homopolymers and copolymers derived from dicarboxylic acids, diols, bisphenols, hydroxy carboxylic acids and/or lactones. Ethylene glycol, propylene glycol, trimethylene glycol, tetramethylene glycol, hexamethylene glycol, 1,4-cyclohexane dimethanol and neopentyl gycol, for example, can be considered for diol components, and isophthalic acid, terephthalic acid, 2,6-, 2,7-, 1,5-, 1,4-naphthaline dicarboxylic acid, diphenic acid and diphenylether-4,4'-dicarboxylic acid can be considered as dicarboxylic acid components. A part of these diol components can be replaced in a known way by a compound with the formula

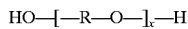

HO—[—R—O—]$_x$—H where x is equal to at least 10, where R represents a bivalent saturated group with 2 to 4 C atoms. In just the same way, a maximum of 20% (mole) of the dicarboxylic acid components can be replaced by aliphatic dicarboxylic acids with 2 to 12 C atoms, such as succinic acid, maleic or fumaric acid, adipic acid, sebacic acid and di-lauric acid. Suitable bisphenols are, for example, bisphenol A, bisphenol T, hydroquinone, tetramethyl bisphenol A or tetramethyl bisphenol S, a suitable hydroxycarboxylic acid is, for example, p-hydroxy benzoic acid, while caprolactone is particularly well suited as a lactone. [These polyesters are typically produced via condensation of a diol, for example, ethylene glycol, 1,4-butanediol or 1,4-] cyclohexane dimethanol with an aromatic dicarboxylic acid, for example isophthalic or terephthalic acid or their esters. Polyethylene terephthalate (PET), polybutylene terephthalate (PBT), or a copolyester of 1,4-butanediol, dilauric acid and terephthalic acid are preferable to use as polyesters.

Processes for the production of these polyesters are described in detail in the literature (e.g. Ullmanns Enzyklopädie der technischen Chemie, Vol. 19, pp. 61+, as well as DE-OS 24 07 155 and DE-OS 24 07 156).

With the polyesters employed according to the invention, polybutylene terephthalate, polyethylene naphthalate and polybutylene naphthalate in particular are preferred.

The anti-static molding compounds according to the invention can be used for the production of injection molded or extruded parts, or for the production of sheets or multilayer hoses or tubes. The invention therefore concerns also thermoplastic multi-layer composites that include at least one layer made of a molding compound on a polyester or polyamide basis and at least one second layer made of polyamide at least partially adjacent to the previously mentioned layer. The polyester or polyamide layers can be made anti-static with very pure carbon black with a low specific surface area. If necessary, a coupling layer can be provided between the polyester or polyamide layers, and this coupling layer binds the polyamide or polyester layer with the other polyamide layer by adhesion.

In a preferred embodiment of the invention, the thermoplastic multi-layer composite consists of an inner and an outer layer of polyamide and a barrier layer adjacent to the inner layer made out of polybutylene terephthalate and, if necessary, a coupling layer between polybutylene terephthalate and polyamide.

In a different embodiment of the invention, the multi-layer composite consists of an inner layer of polybutylene terephthalate and a polyamide outer layer, whereby, if necessary, a coupling layer can be provided between the PBT and the PA layer.

The realization of the multi-layer composite can be accomplished in one or more stages. In the one-stage injection molding process, one brings together the various melts in a form and lets the molded part cool down. In the one-stage extrusion process, the various melts are co-extruded in a typical manner. In the multi-stage processes, a molded part is first produced either from component a) or component b) and is then admitted with the remaining components, which can happen through pressing, injection molding or extrusion.

The multi-layer composites according to the invention have application with construction parts primarily in the area of the electrical, machinery and automotive industries where the excellent peroxide resistance of the polyamides or the polyesters must be combined with good thermal and chemical properties.

The multi-layer composite according to the invention can also have the form of a hose or tube line. In this case, the inner layer is anti-static; that is, the layer made out of a molding compound on a polyester or polyamide basis contains very pure conductive carbon black with a low specific surface area. In this conductive carbon black, as was already explained above, the oxygen and sulfur content is exceptionally low. The characterization of the carbon black according to the invention occurs in Table 2, found further below.

The layer thickness of the hose or tube is not critical. Protective layer thicknesses of 0.2 to 0.6 mm, barrier thicknesses of 0.2 to 0.7 mm and coupling layers of 0.05 to 0.3mm are preferable.

In a preferred embodiment, a three-layer tube consists of the following layers.

Inner: polybutylene terephthalate made anti-static with conductive carbon black: 0.45 to 1 mm. Intermediate layer: made of a coupling layer on a basis of partially crystalline, high-molecular weight block-(co)polyester amides. Outer: polyamide 12, 0.45 mm.

The multi-layer polymer tube can also be corrugated in a partial area.

In an additional preferred embodiment, the hose or tube can consist of four or more layers:

Inner layer: polybutylene terephthalate, polyamide 6 or polyamide 12, layer thickness: 0.1 mm;

if needed, a coupling layer of polyester amide, for example, Grilamid EA2 HV1, if the inner layer is made of polyamide, layer thickness: 0.05–0.3 mm;

Middle layer: polybutylene terephthalate, layer thickness: 0.2 to 0.4 mm;

Coupling layer: on a basis of partially crystalline, high molecular weight block-(co) polyester amides;

Outer layer: polyamide 12 or polyamide 11, sheet thickness: 0.4 to 0.5 mm.

The above-mentioned coupling layer consists of a molding compound on a basis of partially crystalline, high molecular weight block-(co) polyester amides, whereby the block-(co) polyester amides form two crystalline phases and as segments (a) at least one polyamide or co-polyamide block on a basis of polyamides containing lactam with homogenous numbers of average molar masses of at least 1000 g/mole and (b) at least one aromatic polyester and/or co-polyester block with a homogenous number in average molar mass of at least 1000 g/mole, which are formed from monomers selected from the group of aromatic dicarboxylic acids, dicarboxylic acid esters and (c) at least one diol component, that is: polyethylene glycol, polypropylene glycol, polytetrahydrofuran.

The aforementioned coupling or compatibility agents are described in detail in DE-A-19 64 313.3. The disclosure content of the above-cited publication is hereby made an object of this application.

The invention is now illustrated by means of examples, without being limited by them.

Materials used: Polyamide 12 and polybutylene terephthalate: commercially available products of the EMS-CHEMIE company:

TABLE 1

| | Melting point (° C.) | Relative viscosity (m-cresol) | COOH— End groups (eq/g) | NH₂ end groups (eq/g) | MVI (cm³/10 min) |
|---|---|---|---|---|---|
| PA12 | 178 | 1.9 (0.5% solution) | 70 | 20 | 100 275° C., 5 kg |
| PBT | 220 | 2.40 (1% solution) | 8 | 11 (OH end groups) | 90 275° C., 5 kg |

PA 12=polyamide 12
PBT=polybutylene terephthalate
IS: Impact modifier mixture of maleic anhydride-grafted ethylene-propylene copolymers and ethylene-butylene copolymers (n-Tafmer MC-201 of the Mitsui company)
BBSA: Butyl-benzene-sulphonic-acid-amide
Irganox 245: Commercially available product of the Ciba Specialty Chemicals company
Triethylene glycol bis(3-(3'-tert-butyl-4'-hydroxy-5'-methylphenyl)propionate
Irgafos 168: Commercially available product of the Ciba Specialty Chemicals company
Tris(2,4-di-tert-butylphenyl)phosphite
Irganox B1171: Commercially available product of the Ciba Specialty Chemicals company
1/1 mixture of Tris(2,4-di-tert-butylphenyl)phosphite and N,N'-hexamethylene bis (3,5-di-tert-butyl-4-hydroxyhydrocinnamide)

Carbon blacks:

According to the invention: Commercially available product of the MMM/Belgien company Ensaco 250

Not according to the invention: Commercially available product of the Degussa company: Printex XE2

The characterization of these two carbon blacks is derived from the following table.

TABLE 2

| | According to the invention | Printex XE2 (prior art) |
|---|---|---|
| Ash content (%) | 0.01 | 0.3 |
| Sulfur content (%) | 0.06 | 0.17 |
| PH value | 9.6 | 9.5 |
| Volatile components (%) | 0.15 | 0.16 |
| Iron (ppm) | 5 | 170 |
| Vanadium (ppm) | Not detectable | 875 |
| Nickel (ppm) | 2 | 320 |

The polyamide and polyester molding compounds filled with carbon black were produced on a 30 mm twin-screw extruder ZSK 30 of the Werner & Pfleiderer company at temperatures between 240 and 280° C. Thus, both the polymer as well as the carbon black were fed separately into the feed section of the extruder. Plasticizers and fiberglass were fed into the liquid.

The testing of the molding compounds according to and not according to the invention was conducted according to the following parameters:

MVI: (Melt volume index) at 275o C/5 kg according to ISO 1133

Impact (IS): Impact strength according to ISO 179/1eU

Notched impact (NIS): Notched impact strength according to ISO 179/1eA

Tensile stress at yield, elongation at break and modulus of elasticity in tension were determined according to IS0527.

The peroxide resistance was tested on 1 mm tensile impact bars. For this purpose, the specimens are stored in a mixture of 42.5% toluene, 42.5% isooctane and 15% methanol, which also contains 180 mmole/l of tert-butylhydroperoxide and 10 mg of Cu⁺⁺/l, at 60o C. for 14 days. The elongation at break of the non-stored specimens is compared to that of the specimens at the end of the storage. The percent change of the elongation at break is indicated in the table.

Surface resistance: DIN 53482 on 100×100×3 mm sheets

| | 1 | 2 | 3 | 4 | 5 | 6 | 7 | V1 | V2 | V3 |
|---|---|---|---|---|---|---|---|---|---|---|
| PA12 | 81.3 | 74.3 | 63.3 | 58.3 | 74.3 | 74.3 | | 71 | 58 | |
| PBT | | | | | | | 61.5 | | | 74.5 |
| IS | | 5 | | 5 | 5 | 5 | 20 | 20 | 18 | 15 |
| BBSA | | | | | 10 | | | | 15 | |
| Fiberglass | | | 20 | 20 | | | | | | |
| Ensaco 250 | 18 | 20 | 16 | 16 | 20 | 20 | 18 | | | |
| Printex XE2 | | | | | | | | 8 | 8 | 10 |
| Irganox 245 | 0.5 | 0.5 | 0.5 | 0.5 | 0.5 | 0.5 | | 1 | 1 | |
| Hostanox PAR24 or (Irgafos 168) | 0.2 | 0.2 | 0.2 | 0.2 | 0.2 | 0.2 | | | | |

-continued

|  | 1 | 2 | 3 | 4 | 5 | 6 | 7 | V1 | V2 | V3 |
|---|---|---|---|---|---|---|---|---|---|---|
| Irganox B1171 |  |  |  |  |  |  | 0.5 |  |  | 0.5 |
| MVI (cm$^3$/10 min) | 24 | 13 | 8 | 8 | 28 | 17 | 20 |  |  | 10 |
| IS 23° C. kJ/m$^2$ | no break | no break | 70 | 70 | no break | no break | no break | no break | no break | 75 |
| IS −40° C. kJ/m$^2$ | no break | no break | 55 | 75 | no break | no break | no break | no break | no break | 50 |
| NIS 23° C. kJ/m$^2$ | 5 | 8 | 10 | 20 | 70 | 8 | 65 | no break | no break | 4 |
| NIS −40° C. kJ/m$^2$ | 6 | 7 | 5 | 10 | 3 | 6 | 10 | 12 | 6 | 2 |
| Yield stress (MPa) | 53 | 44 | 80 | 85 | 30 | 45 | 30 | 35 | 25 | 40 |
| Elongation at break (%) | 70 | 60 | 8 | 6 | 190 | 70 | 25 | 140 | 260 | 6 |
| Modulus of elasticity in tension (MPa) | 2100 | 1800 | 4700 | 5000 | 700 | 1700 | 1500 | 1300 | 300 | 2100 |
| Sourgas (%) | +7 | −9 | +62 | +7 | −40 | −8 | +81 | No longer measurable, embrittled | No longer measurable, embrittled | No longer measurable, embrittled |
| Surface resistance (Ohm) | $2 \times 10^6$ | $7 \times 10^4$ | $10^5$ | $7 \times 10^6$ | $2 \times 10^4$ | $2 \times 10^5$ | $1 \times 10^4$ | $2 \times 10^5$ | $2 \times 10^4$ | $3 \times 10^4$ |

What is claimed is:

1. An anti-static, peroxide stable molding compound comprising:
a molding compound selected from the group consisting of polyamides, polyesters, and mixtures thereof, wherein said molding compound is modified with very pure conductive carbon black having a relatively low specific surface area, and wherein said conductive carbon black constitutes from 5 to 25 percent by weight of said anti-static, peroxide stable molding compound.

2. An anti-static, peroxide stable molding compound according to claim 1, wherein said conductive carbon black has a sulfur content of less than 0.5% by weight.

3. An anti-static, peroxide stable molding compound according to claim 1, wherein said conductive carbon black has a sulfur content of 0.1% by weight or less.

4. An anti-static, peroxide stable molding compound according to claim 1, said molding compound comprising a polyamide selected from the group consisting of homopolyamides and copolyamides of PA 6, PA 46, PA 66, PA 612, PA 1010, PA 1012, PA 69, PA 11, PA 12, PA 1212, PA 6T, PA 6I, PA 12T, PA 12I, PA 12/6T, PA 12/6I, and mixtures thereof.

5. An anti-static, peroxide stable molding compound according to claim 1, said molding compound comprising a polyamide selected from the group consisting of homopolyamides and copolyamides of PA 12.

6. An anti-static, peroxide stable molding compound according to claim 2, said molding compound comprising a polyamide selected from the group consisting of homopolyamides and copolyamides of PA 6, PA 46, PA 66, PA 612, PA 1010, PA 1012, PA 69, PA 11, PA 12, PA 1212, PA 6T, PA 6I, PA 12T, PA 12I, PA 12/6T, PA 12/6I, and mixtures thereof.

7. An anti-static, peroxide stable molding compound according to claim 1, said molding compound comprising a polyester selected from the group consisting of polyethylene terephthalate, polybutylene terephthalate, polyethylene naphthalate and polybutylene naphthalate, and mixtures thereof.

8. An anti-static, peroxide stable molding compound according to claim 2, said molding compound comprising a polyester selected from the group consisting of polyethylene terephthalate, polybutylene terephthalate, polyethylene naphthalate and polybutylene naphthalate, and mixtures thereof.

9. An anti-static, peroxide stable molding compound according to claim 1 wherein said carbon black is present in an amount in the range of 5 to 25 percent by weight of said molding compound.

10. An anti-static, peroxide stable molding compound according to claim 2 wherein said carbon black is present in an amount in the range of 5 to 25 percent by weight of said molding compound.

11. An anti-static, p eroxide stable molding compound according to claim 3 wherein said carbon black is present in an amount in the range of 5 to 25 percent by weight of said molding compound.

12. An anti-static, peroxide stable molding compound according to claim 4 wherein said carbon black is present in an amount in the range of 5 to 25 percent by weight of said molding compound.

13. An anti-static, peroxide stable molding compound according to claim 1 wherein said carbon black is present in an amount in the range of 15 to 25 percent by weight of said molding compound.

14. An anti-static, peroxide stable molding compound according to claim 2 wherein said carbon black is present in an amount in the range of 15 to 25 percent by weight of said molding compound.

15. An anti-static, peroxide stable molding compound according to claim 3 wherein said carbon black is present in an amount in the range of 15 to 25 percent by weight of said molding compound.

16. An anti-static, peroxide stable molding compound according to claim 4 wherein said carbon black is present in an amount in the range of 15 to 25 percent by weight of said molding compound.

17. An injection molded tubular object comprising a molding compound according to claim 1.

18. An injection molded tubular object comprising a molding compound according to claim 2.

19. An injection molded tubular object comprising a molding compound according to claim 4.

20. An injection molded tubular object comprising a molding compound according to claim 7.

21. An extruded tubular object comprising a molding compound according to claim 1.

22. An extruded tubular object comprising a molding compound according to claim 2.

23. An extruded tubular object comprising a molding compound according to claim 4.

24. An extruded tubular object comprising a molding compound according to claim 7.

25. A multi-layer extruded tubular object comprising a molding compound according to claim 1.

26. A multi-layer extruded tubular object comprising a molding compound according to claim 2.

27. A multi-layer extruded tubular object comprising a molding compound according to claim 4.

28. A multi-layer extruded tubular object comprising a molding compound according to claim 7.

29. A multi-layer thermoplastic composite, comprising:
 (a) a first layer of an anti-static, peroxide stable molding compound comprising a compound selected from the group consisting of polyamides, polyesters, and mixtures thereof, wherein said molding compound being modified with highly purified conductive carbon black having a relatively low specific surface area; and
 (b) at least one second layer a polyamide molding compound adjacent to said first layer.

30. A multi-layer thermoplastic composite according to claim 29 wherein said first layer comprises a polyester selected from the group consisting of polybutylene terephthalate, polybutylene naphthalate and polyethylene naphthalate.

31. A multi-layer thermoplastic composite according to claim 29 additionally comprising at least one coupling layer that adhesively binds said first layer to said at least one second layer.

32. A multi-layer thermoplastic composite according to claim 29, additionally comprising a barrier layer made of polybutylene terephthalate adjacent to said first layer.

33. An injection molded tubular object comprising a multi-layer thermoplastic composite according to claim 29.

34. An injection molded tubular object comprising a multi-layer thermoplastic composite according to claim 31.

35. An injection molded tubular object comprising a multi-layer thermoplastic composite according to claim 32.

36. An extruded tubular object comprising a multi-layer thermoplastic according to claim 29.

37. An extruded tubular object comprising a multi-layer thermoplastic according to claim 31.

38. An extruded tubular object comprising a multi-layer thermoplastic according to claim 32.

39. A multi-layer polymeric composite tube having an inner layer, said inner layer comprising very pure conductive carbon black having a relatively low specific surface area, so as to render said tube able to conduct static electricity.

* * * * *